United States Patent Office 3,095,686
Patented July 2, 1963

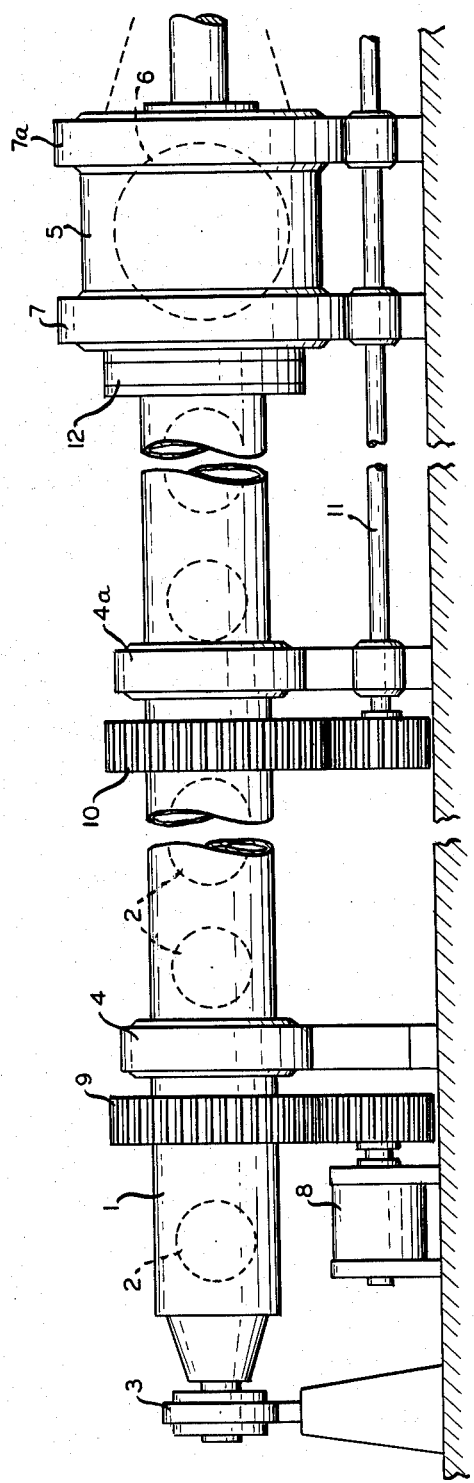

3,095,686
SPEED-STRANDING MACHINE
Max Steinlein, Stuttgart-Stammheim, Germany, assignor to Kreidler's Metall- und Drahtwerke G.m.b.H., Stuttgart-Zuffenhausen, Germany, a corporation of Germany
Filed May 31, 1961, Ser. No. 113,801
1 Claim. (Cl. 57—58.3)

The present invention relates to a speed-stranding machine.

Speed-stranding machines are known which comprise an elongated, particularly tubular stranding body adapted to receive the wire drums disposed in series relative to each other and, in addition, a forwardly disposed enlarged cage for the reception of the core strand drum.

Due to the unequal distribution of the masses between the elongated stranding body and the forwardly disposed cage, oscillations have been found to exist during the operation of such machine, particularly rotary oscillations. These rotary oscillations brought about a disadvantageous effect upon the duration of the connection between the elongated stranding body and the cage, and also upon the life of the bearings supporting these elements.

It is, therefore, one object of the present invention to provide a speed-stranding machine, which avoids the drawbacks of the known structures.

It is another object of the present invention to provide a speed-stranding machine, wherein the stranding body and the cage are supported independently from each other, yet are coupled for a common rotary movement by means of oscillation damping means which are also elastic in rotary direction.

In the known speed-stranding machines with individual stranding bodies which are supported independently from each other, a relative rotary movement or an elastic connection in rotary direction of the individual stranding bodies relative to each other and the damping of rotary oscillations was not provided. They were not permitted to be arranged in these known structures, in order not to cause irregularities in the heading-length of the produced strands. Such caution is not required, however, in the present arrangement, as will be set forth further below.

With these and other objects in view, which will become apparent in the following detailed description, the present invention will be clearly understood in connection with the accompanying drawing, in which the only FIGURE is an elevation of the speed-stranding machine.

Referring now to the drawing, the speed-stranding machine has a drive for the forwardly disposed cage portion originating from the tubular stranding body. The elongated, tubular stranding body 1, designed for the support of the wire drums 2, is mounted on the bearings 3, 4, 4a and others. The front cage 5 for the core strand drum 6 is mounted on the bearings 7 and 7a, which are separated from the stranding body 1. The driving motor 8 is arranged to drive the stranding body 1 over a reduction gear 9. An intermediate drive 10 is disposed in a front section of the stranding body 1. The intermediate drive 10 is in operative connection with a shaft 11 for the switching drive of the stranding head and for the beam and for the reel (not shown). The drive for the front cage 5 takes place over a coupling 12 disposed between the cage 5 and the stranding body 1, which coupling 12 is elastic in a rotary direction, and has the characteristic of damping any oscillations. The coupling 12, which is known per se, is yielding in a rotary direction and its structure is not part of the present invention, particularly since any known coupling yielding in a rotary direction can be used.

A rotary elastic connection at the point set forth above of a stranding machine does not exert a damaging influence on the beating length, as it would be the case in an arrangement between the engaging points of the tubular stranding body, since as is known, the core strand runs through smoothly and is merely equipped with a layer and is thus not itself stranded.

While I have disclosed one embodiment of the present invention, it is to be understood that this embodiment is given by example only and not in a limiting sense, the scope of the present invention being determined by the objects and the claim.

I claim:

A speed-stranding machine, comprising an elongated, tubular stranding body, a plurality of supply drums disposed in series relative to each other and received by said stranding body, a forwardly disposed cage larger than said supply drums adapted to receive the drum for a core-strand, and separate bearing means for said stranding body and said cage, respectively, means for coupling said stranding body with said cage for joint rotary movement, said coupling means including means for damping of oscillations between said stranding body and said cage and for connecting said stranding body with said cage elastically in a rotary direction.

References Cited in the file of this patent
UNITED STATES PATENTS
2,416,126    Somerville _____ Feb. 18, 1947
FOREIGN PATENTS
80,518    Austria _____ Apr. 26, 1920